Patented Aug. 31, 1954

2,687,963

UNITED STATES PATENT OFFICE 2,687,963

COMBINATION SCRATCH REMOVER AND POLISH FOR FURNITURE AND THE LIKE

Jesse J. Marshall, Tacoma, Wash., assignor of one-half to Willis S. Marshall, Tacoma, Wash.

No Drawing. Application July 28, 1951, Serial No. 239,180

2 Claims. (Cl. 106—7)

The present invention relates to a combination scratch remover and polish for furniture and like articles having surfaces coated with varnish, lacquer, shellac and similar coating materials.

It is a primary object of the present invention to provide a material which effectively will remove scratches, stains, and other superficial blemishes from the coated surfaces of furniture and similar articles.

It is another important object of the present invention to provide a material which will polish and impart a high gloss to furniture and similar articles.

Still another object of the present invention is the provision of a material which will contemporaneously and in a single operation remove scratches, stains and other blemishes from the surface of objects such as furniture while imparting thereto a substantial polish and gloss.

Still a further object of this invention is the provision of a combination scratch remover and polish which is applicable to a wide variety of articles having diverse types of surface finishes.

A further object of the present invention is the provision of a combination scratch remover and polish which may be applied in a single operation rapidly and with a minimum of effort.

Generally stated, the combination scratch remover and polish of my invention comprises paraffin oil, wax, a coating material and a vehicle in the relative proportions set forth in Table I:

Table I

| | Parts by volume |
|---|---|
| Paraffin oil | 4–16 |
| Wax | ¼–3 |
| Coating material | 3–12 |
| Vehicle | 25–100 |

In its more specific embodiments, the combination scratch remover and polish formulations of my invention have the approximate compositions outlined in Table II:

Table II

| | General Range, Parts by volume | Specific Formulation, Parts by Volume |
|---|---|---|
| Paraffin Oil | 4–16 | 8 |
| Wax | ¼–3 | 1 |
| Varnish | 1–4 | 2 |
| Lacquer | 1–4 | 2 |
| Shellac | 1–4 | 2 |
| Lacquer Thinner | 1–4 | 2 |
| Alcohol | 8–32 | 16 |
| Naphthenic Base Oil | 16–64 | 32 |

The term "paraffin oil" as used herein is intended to comprehend the substantially colorless, viscous hydrocarbon oils obtained, for example, as products of the petroleum industry. A suitable paraffin oil for the purposes of the present invention comprises that marketed by the Standard Oil Company of California having a viscosity at 100° F. of 130–140 S. S. U., a flash point of 320° F. (Cleveland Open Cup Method) and a pour point of 20° F.

The term "wax" is employed herein to designate broadly waxes of mineral, vegetable or animal origin. Suitable waxes comprise, for example, beeswax, candelilla wax, carnauba wax, and paraffin wax. The ordinary paraffin wax of commerce is a preferred member of this class of substances for use in the present invention.

The term "varnish" as used herein is intended to denote that class of coating materials comprising natural or synthetic resins dissolved in a drying oil such as linseed oil or tung oil. It also is intended to comprehend the so-called spirit varnishes wherein natural or artificial resins are dissolved in volatile solvents, such as alcohols or esters. For the present purpose it is preferred to employ a clear, oil varnish which is substantially colorless or of very light color.

As defined herein the term "lacquer" includes those coating materials, comprising a solution of a resinous material which when applied to an object, as by dipping, spraying or brushing, dries by evaporation of the solvent, leaving a protective covering. Particularly suitable lacquers comprise the solutions of the cellulose esters, e. g. cellulose nitrate or cellulose acetate dissolved in a solvent such as acetone, ethanol or ethyl acetate.

The term "shellac" as used herein comprehends an alcoholic solution of gum shellac in a suitable solvent such as alcohol.

By "lacquer thinner" is meant the various volatile solvents used in the formulation of lacquers, particularly the alcohols, ethers, ketones, and esters, used singly or in combination with each other. Illustrative of such lacquer thinners are ethyl alcohol, propyl alcohol, isopropyl alcohol, acetone, methyl ethyl ketone, diethyl ether, methyl ethyl ether, methyl acetate, ethyl acetate and amyl acetate.

The term "alcohol" is used herein to denote the lower aliphatic alcohols, i. e. those having less than about 6 carbon atoms, including methyl alcohol, ethyl alcohol, propyl alcohol and the like.

The term "naphthenic base oil" as used herein includes those naphthenic base oil products of the petroleum industry which are somewhat more penetrating and less viscous than the paraffin oils. A suitable oil of this class for the purpose of the present invention comprises that marketed by the Union Oil Company of California under the trademark "Red Lion Oil" having a viscosity at 100° F. of 100 S. S. U., a flash point of 325° F. and a fire point of 360° F. (Cleveland Open Cup Method) a gravity of 26.4, and a viscosity index of 28.

In formulating the hereindescribed blemish removing and polish composition, the individual components are combined and thoroughly mixed until their blending together and mutual solution has been achieved. This operation may be facilitated by heating the mixture to approximately its boiling point during the mixing operation. It then is cooled to substantially room temperature, when it is ready for use.

The presently described composition may be applied, for example, to a scratched and stained surface of an article of furniture by saturating a cloth with it or by pouring a small amount of it on the surface to be processed. It then is worked into the surface by rubbing it gently, whereupon the first observable effect is the disappearance of the stains and scratches. Continued rubbing then will produce an attractive and enduring gloss on the surface, which is easily maintained in a polished condition and which protects the surface from further abrasive action and wear.

The foregoing desirable result is achieved by reason of a significant mutual cooperation between the ingredients of the mixture. Without commitment to any particular theory, I believe that the first effect when my blemish removing and polishing composition is applied to a coated wood surface, is the penetration of the solvents, particularly the naphthenic base oil, contained in the composition into the coating surrounding the scratch or stain. This makes these areas particularly receptive to recoating by the coating materials, i. e. the varnish, lacquer or shellac present in the composition.

The coating materials then renew the surface of the coating which has been marred by the scratches or stains, restoring it to its original condition. They also prevent the return of the scratch or stain upon evaporation of the solvent.

The paraffin oil appears to act as a lubricant so that the composition flows readily upon the surface to be polished where it may be rubbed and polished easily and with a minimum of effort. It also contributes to the gloss of the finished surface.

The wax serves the primary function of covering over the renewed surface from which the stains and scratches have been removed. After polishing it imparts a gloss to the surface and protects it from wear.

Thus it will be apparent that by the present invention I have provided a composition which is effective in removing blemishes, such as scratches and stains, from the surface of furniture and like articles. It also acts as a polish to impart a pleasing gloss to the renewed surfaces of the articles. Furthermore, it is easily formulated and applicable with a minimum of effort to a wide variety of coated surfaces.

Having now described my invention in preferred embodiments, I claim:

1. The combination blemish removing and polish for furniture and the like consisting essentially of:

| | Parts by volume |
|---|---|
| Paraffin oil | 4–16 |
| Wax | ¼–3 |
| Varnish | ¼ |
| Lacquer | ¼ |
| Shellac | ¼ |
| Lacquer thinner | ¼ |
| Lower aliphatic alcohol containing from 1 to 6 carbon atoms | 8–32 |
| Naphthenic base oil | 16–64 |

2. The combination blemish removing and polish for furniture and the like, consisting essentially of:

| | Parts by volume |
|---|---|
| Paraffin oil | 8 |
| Wax | 1 |
| Varnish | 2 |
| Lacquer | 2 |
| Shellac | 2 |
| Lacquer thinner | 2 |
| Lower aliphatic alcohol containing from 1 to 6 carbon atoms | 16 |
| Naphthenic base oil | 32 |

References Cited in the file of this patent

UNITED STATES PATENTS

| Number | Name | Date |
|---|---|---|
| 975,394 | Bryant | Nov. 15, 1910 |
| 1,123,709 | Donovan | Jan. 5, 1915 |
| 1,410,041 | Taylor et al. | Mar. 21, 1922 |
| 1,410,471 | Haynes | Mar. 21, 1922 |
| 1,492,404 | Smith | Apr. 29, 1924 |

FOREIGN PATENTS

| Number | Country | Date |
|---|---|---|
| 12,305 | Great Britain | Aug. 4, 1894 |
| 13,321 | Great Britain | Sept. 21, 1905 |
| 1,488 | Great Britain | Nov. 14, 1907 |
| 17,591 | Great Britain | Nov. 5, 1908 |
| 409,058 | Great Britain | Apr. 26, 1934 |
| 425,323 | Great Britain | Mar. 12, 1935 |